United States Patent
Martinez et al.

(10) Patent No.: US 8,164,340 B2
(45) Date of Patent: Apr. 24, 2012

(54) METHOD FOR DETERMINING ELECTROMAGNETIC SURVEY SENSOR ORIENTATION

(75) Inventors: Yardenia Martinez, Houston, TX (US); Norman C. Allegar, Houston, TX (US); Leon A. Thomsen, Houston, TX (US); Charles Stoyer, Golden, CO (US)

(73) Assignee: KJT Enterprises, Inc., Houston, TX (US)

( * ) Notice: Subject to any disclaimer, the term of this patent is extended or adjusted under 35 U.S.C. 154(b) by 716 days.

(21) Appl. No.: 12/256,595

(22) Filed: Oct. 23, 2008

(65) Prior Publication Data

US 2010/0102820 A1    Apr. 29, 2010

(51) Int. Cl.
*G01V 3/00* (2006.01)

(52) U.S. Cl. .......................... 324/365; 324/334; 324/326

(58) Field of Classification Search .................. 324/365, 324/334, 326, 327, 328, 329; 702/150
See application file for complete search history.

(56) References Cited

U.S. PATENT DOCUMENTS

| | | | |
|---|---|---|---|
| 5,467,018 A | 11/1995 | Ruter | |
| 5,563,513 A | 10/1996 | Tasci | |
| 6,021,090 A | 2/2000 | Gaiser | |
| 6,541,975 B2 | 4/2003 | Strack | |
| 6,603,313 B1 * | 8/2003 | Srnka | 324/354 |
| 6,628,119 B1 | 9/2003 | Eidesmo | |
| 6,670,813 B2 | 12/2003 | Strack | |
| 6,739,165 B1 | 5/2004 | Strack | |
| 6,891,376 B2 | 5/2005 | Hanstein | |
| 7,203,599 B1 | 4/2007 | Strack et al. | |
| 7,328,107 B2 | 2/2008 | Strack | |
| 7,340,348 B2 | 3/2008 | Strack | |
| 7,356,411 B1 | 4/2008 | Stoyer | |
| 7,388,382 B2 | 6/2008 | Strack | |
| 2004/0232917 A1 | 11/2004 | Wright | |
| 2006/0001428 A1 * | 1/2006 | Milne et al. | 324/360 |
| 2006/0091889 A1 * | 5/2006 | Ellingsrud et al. | 324/334 |
| 2009/0184715 A1 * | 7/2009 | Summerfield et al. | 324/334 |

FOREIGN PATENT DOCUMENTS

GB    2438430 A    11/2007

(Continued)

OTHER PUBLICATIONS

Behrens, James Philip (2005). [The detection of electrical anisotropy in 35 Ma Pacific lithosphere: Results from a marine controlled-source electromagnetic survey and implications for hydration of the upper mantle. Ph.D. dissertation, University of California, San Diego,. Dissertations & Theses: Full Text.(Publication No. AAT 3189793)].*

(Continued)

*Primary Examiner* — Huy Q Phan
*Assistant Examiner* — Temilade S Rhodes-Vivour
(74) *Attorney, Agent, or Firm* — Richard A. Fagin

(57) ABSTRACT

A method for determining orientation of an electromagnetic survey sensor includes deploying the sensor at a selected position on the bottom of a body of water. An electromagnetic field is generated at a selected position in the body of water. A portion of the electromagnetic field is detected along at least two orthogonal directions at the sensor. A portion of the detected electromagnetic field is selected as having traveled only in a vertical plane which includes both source position and sensor position. The polarization direction of the selected portion of the electromagnetic field is determined from the selected portion. The determined polarization direction is used to determine the sensor orientation.

22 Claims, 8 Drawing Sheets

FOREIGN PATENT DOCUMENTS

| WO | 0157555 A1 | 8/2001 |
|---|---|---|
| WO | 03048812 A1 | 6/2003 |
| WO | 2008/024184 A2 | 2/2008 |

OTHER PUBLICATIONS ("Seismic Polarization Filtering: Noise Reduction and Off-Line Imaging", Ye, Zheng, Sep. 1995).*

Mittet, Rune, Odd Marius Aakervik, Hans Roger Jensen, Svein Ellingsrud, and Alexey Stovas, "On the orientation and absolute phase of marine CSEM receivers," Geophysics, vol. 72, No. 4, Jul. 1, 2007, pp. F145-F155.

Notification of transmittal of the international search report and the written opinion of the international searching authority, International patent application No. PCT/US2009/055793, Dec. 13, 2010.

Weitemeyer, K. A., S. C. Constable, K. W. Key, and J. P. Behrens. (2006). *First results from a marine controlled-source electromagnetic survey to detect gas hydrates offshore Oregon*. Geophysical Research Letters, vol. 33, L03304, pp. 1-4.

Weitemeyer, K. (Mar. 19-20, 2008). *Modeling the hydrate ridge data in 1D and 2D and issues arising*. Lecture presented at SEMC Workshop at Scripps Institution of Oceanography.

Weitemeyer, K., S. Constable, K. Key, and J. Behrens. (Apr. 19-21, 2006). *Imaging Submarine Gas Hydrate Using EM Methods*. Lecture presented at MARELEC conference at the Marine Establishment in Amsterdam, Netherlands.

Sinha, M.C. Patel, P.D., Unsworth, M.J., Owen, T.R.E., and MacCormack, M.G.R., 1990, An active source electromagnetic sounding system for marine use, Marine Geophysical Research, 12, 29-68.

Edwards, R.N., Law, L.K., Wolfgram, P.A., Nobes, D.C., Bone, M.N., Trigg, D.F., and DeLaurier, J.M., 1985, First results of the MOSES experiment: Sea sediment conductivity and thickness determination, Bute Inlet, British Columbia, by magnetometric offshore electrical sounding: Geophysics 50, No. 1, 153-160.

Edwards, R.N., 1997, On the resource evaluation of marine gas hydrate deposits using the sea-floor transient electric dipole-dipole method: Geophysics, 62, No. 1, 63-74.

Chave, A.D., Constable, S.C. and Edwards, R.N., 1991, Electrical exploration methods for the seafloor: Investigation in geophysics No. 3, Electromagnetic methods in applied geophysics, vol. 2, application, part B, 931-966.

Cheesman, S.J., Edwards, R.N., and Chave, A.D., 1987, On the theory of sea-floor conductivity mapping using transient electromagnetic systems: Geophysics, 52, No. 2, 204 217.

Strack, K.-M., 1992, Exploration with deep transient electromagnetics, Elsevier, 373 pp. (reprinted 1999).

Duncan, P.M., Hwang, A., Edwards, R.N., Bailey, R.C., and Garland, G.D., 1980, The development and applications of a wide band electromagnetic sounding system using pseudo-noise source. Geophysics, 45, 1276-1296.

* cited by examiner

METHOD FOR DETERMINING ELECTROMAGNETIC SURVEY SENSOR ORIENTATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic geophysical surveying. More specifically, the invention relates to methods for accurately determining the orientation of electromagnetic sensors deployed to perform such surveying.

2. Background Art

Electromagnetic survey systems and methods provide a variety of data about subsurface formations; including, for example, the spatial distribution of resistivity in the Earth's subsurface. Such data are interpreted and evaluated, among other purposes, to improve prediction of oil and gas production from a given reservoir or field, to detect new oil and gas reservoirs, to provide a picture or model of subsurface formations and of reservoirs in order to facilitate the removal of hydrocarbons, and/or to reduce the risk or otherwise enhance the process of well location.

Controlled source electromagnetic ("CSEM") surveying includes imparting an electric current or a magnetic field into subsurface Earth formations (through the sea floor in marine surveying or through the borehole fluid in borehole surveying), and measuring voltages and/or magnetic fields induced in electrodes, antennas and/or magnetometers disposed near the Earth's surface, on the sea floor, or in a borehole. The voltages and/or magnetic fields are induced in response to the electric current and/or magnetic field imparted into the Earth's subsurface, and the recorded signal is interpreted in terms of distributions of resistivity, induced polarization, etc, within the earth.

Controlled source surveying, as known in the art, typically includes imparting continuous, alternating electric current into the subsurface. The alternating current may have one or more selected frequencies. Such surveying is known as frequency domain controlled source electromagnetic (f-CSEM) surveying. f-CSEM surveying techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research, 12, 29-68. Other publications which describe the physics of and the interpretation of electromagnetic subsurface surveying include: Edwards, R. N., Law, L. K., Wolfgram, P. A., Nobes, D. C., Bone, M. N., Trigg, D. F., and DeLaurier, J. M., 1985, *First results of the MOSES experiment: Sea sediment conductivity and thickness determination, Bute Inlet, British Columbia, by magnetometric offshore electrical sounding*: Geophysics 50, No. 1, 153-160; Edwards, R. N., 1997, *On the resource evaluation of marine gas hydrate deposits using the sea-floor transient electric dipole-dipole method*: Geophysics, 62, No. 1, 63-74; Chave, A. D., Constable, S. C. and Edwards, R. N., 1991, *Electrical exploration methods for the seafloor*: Investigation in geophysics No 3, Electromagnetic methods in applied geophysics, vol. 2, application, part B, 931-966; and Cheesman, S. J., Edwards, R. N., and Chave, A. D., 1987, *On the theory of sea-floor conductivity mapping using transient electromagnetic systems*: Geophysics, 52, No. 2, 204-217. Typical borehole-related applications are described in Strack (U.S. Pat. Nos. 6,541,975 B2, 6,670,813, and 6,739,165) and Hanstein et al., (U.S. Pat. No. 6,891,376). The proposed methodology is not limited to such applications, as it is more general than these specific contexts.

Another technique for electromagnetic surveying of subsurface Earth formations known in the art is transient controlled source electromagnetic surveying (t-CSEM™). In t-CSEM, electric current is imparted into the Earth at the Earth's surface, in a manner similar to f-CSEM, but in transient fashion. The initial electric current may be direct current (DC). At a selected time, the electric current is switched off, and induced voltages and/or magnetic fields are measured, typically with respect to time over a selected time interval, at the Earth's surface. The switching constitutes the transient event that gives the technique its name; in contrast with certain realizations of f-CSEM (which also involve switching), in t-CSEM a long time interval elapses before the next transient is initiated, long enough for the induced fields to decay away, so that the detection occurs while the source is inactive. The electrical structure of the subsurface is inferred by the time distribution of the induced voltages and/or magnetic fields. t-CSEM techniques are described, for example, in Strack, K.-M., 1992, *Exploration with deep transient electromagnetics*, Elsevier, 373 pp. (reprinted 1999).

Following are described several patent publications which describe various aspects of electromagnetic subsurface Earth surveying. U.S. Pat. No. 6,603,313 B1 issued to Srnka discloses a method for surface estimation of reservoir properties, in which location of and average earth resistivities above, below, and horizontally adjacent to subsurface geologic formations are first determined using geological and geophysical data in the vicinity of the subsurface geologic formation. Then dimensions and probing frequency for an electromagnetic source are determined to substantially maximize transmitted vertical and horizontal electric currents at the subsurface geologic formation, using the location and the average earth resistivities. Next, an electromagnetic source is activated at or near surface, approximately centered above the subsurface geologic formation and a plurality of components of electromagnetic response is measured with a receiver array. Geometrical and electrical parameter constraints are determined, using the geological and geophysical data. Finally, the electromagnetic response is processed using the geometrical and electrical parameter constraints to produce inverted vertical and horizontal resistivity depth images. Optionally, the inverted resistivity depth images may be combined with the geological and geophysical data to estimate the reservoir fluid and shaliness properties. This method employs a simple technique for determining the orientations of the receivers, which is improved upon with the present invention.

U.S. Pat. No. 6,628,110 B1 issued to Eidesmo et al. discloses a method for determining the nature of a subterranean reservoir whose approximate geometry and location are known. The disclosed method includes: applying a time varying electromagnetic field to the strata containing the reservoir; detecting the electromagnetic wave field response; and analyzing the effects on the characteristics of the detected field that have been caused by the reservoir, thereby determining the content of the reservoir, based on the analysis.

This method employs a simple technique for determining the orientations of the receivers, which is improved upon with the present invention.

U.S. Pat. No. 6,541,975 B2 and U.S. Pat. No. 6,670,813 issued to Strack disclose a system for generating an image of an Earth formation surrounding a borehole penetrating the formation. Resistivity of the formation is measured using a DC measurement, and conductivity and resistivity of the formations is measured with a time domain signal or AC measurement. The acoustic velocity of the formation is also measured. The DC resistivity measurement, the conductivity measurement made with a time domain electromagnetic signal, the resistivity measurement made with a time domain electromagnetic signal and the acoustic velocity measurements are combined to generate the image of the Earth formation. In this method, the orientation of the receivers is determined using conventional borehole methods, and the present invention is not applicable to this context.

U.S. Pat. No. 6,739,165 issued to Strack discloses a method where transient electromagnetic measurements are performed with a receiver or transmitter being placed in a borehole and the other being placed on the surface. Either is moved between initiations of the transient source (and the consequent transmission of EM energy with the earth) to new locations where the experiment is repeated. After data processing, images of fluid content changes of the reservoir are obtained. This method employs a simple technique for determining the orientations of the surface receivers, which is improved upon with the present invention.

International Patent Application Publication No. WO 0157555 A1 discloses a system for detecting a subterranean reservoir or determining the nature of a subterranean reservoir whose position and geometry is known from previous seismic surveys. An electromagnetic field is applied by a transmitter on the seabed and is detected by antennae also on the seabed. A refracted wave component is sought in the wave field response, to determine the nature of any reservoir present. This method employs a simple technique for determining the orientations of the receivers, which is improved upon with the present invention.

International Patent Application Publication No. WO 03048812 A1 discloses an electromagnetic survey method for surveying an area previously identified as potentially containing a subsea hydrocarbon reservoir. The method includes obtaining first and second survey data sets with an electromagnetic source aligned end-on and broadside relative to the positions of the same or different receivers. The invention also relates to planning a survey using this method, and to analysis of survey data taken in combination, which allows the galvanic contribution to the signals collected at the receiver to be contrasted with the inductive effects, and the analysis of the effects of signal attenuation, which are highly dependent on local properties of the rock formation, overlying water, and air at the survey area. This is very important to the success of using electromagnetic surveying for identifying hydrocarbon reserves and distinguishing them from other classes of subsurface structure. This method employs a simple technique for determining the orientations of the receivers, which is improved upon with the present invention.

U.S. Patent Application Publication No. 2004/232917 filed by Wright et al. relates to a method of mapping subsurface resistivity contrasts by making multichannel transient electromagnetic (MTEM) measurements on or near the Earth's surface using at least one source, means for measuring the system response, and at least one receiver for measuring the resultant earth response. All signals from the or each source-receiver pair are processed to recover the corresponding electromagnetic impulse response of the earth and such impulse responses, or any transformation of such impulse responses, are displayed to create a subsurface representation of resistivity contrasts. The system and method enable subsurface fluid deposits to be located and identified and the movement of such fluids to be monitored. This method employs a simple technique for determining the orientations of the receivers, which is improved upon with the present invention.

U.S. Pat. No. 5,467,018 issued to Rueter et al. discloses a bedrock exploration system. The system includes transients generated as sudden changes in a transmission stream, which are transmitted into the Earth's subsurface by a transmitter. The induced electric currents thus produced are measured by several receiver units. The measured values from the receiver units are passed to a central unit. The measured values obtained from the receiver units are digitized and stored at the measurement points, and the central unit is linked with the measurement points by a telemetry link. By means of the telemetry link, data from the data stores in the receiver units can be successively passed on to the central unit. This method employs a simple technique for determining the orientations of the receivers, which is improved upon, in the marine context, with the present invention.

U.S. Pat. No. 5,563,913 issued to Tasci et al. discloses a method and apparatus used in providing resistivity measurement data of a sedimentary subsurface. The data are used for detecting and mapping an anomalous resistivity pattern. The anomalous subsurface resistivity pattern is associated with and an aid for finding oil and/or gas traps at various depths down to a basement of the sedimentary subsurface. The apparatus is disposed on a ground surface and includes an electric generator connected to a transmitter with a length of wire with grounded electrodes. When large amplitude, long period, square waves of current are sent from a transmission site through the transmitter and wire, secondary eddy currents are induced in the subsurface. The eddy currents induce magnetic field changes in the subsurface which can be measured at the surface of the earth with a magnetometer or induction coil. The magnetic field changes are received and recorded as time varying voltages at each sounding site. Information receiver, and resistivity variations of the subsurface formations are deduced from the amplitude and shape of the measured magnetic field signals plotted as a function of time after applying appropriate mathematical equations. The sounding sites are arranged in a plot-like manner to ensure that aerial contour maps and cross sections of the resistivity variations of the subsurface formations can be prepared. In this method, the orientation of the receivers is determined using conventional land-survey methods, and the present invention is not applicable to this context.

Other patents related to t-CSEM surveying include U.S. Pat. No. 7,388,382 issued to Strack et al., U.S. Pat. No. 7,356,411 issued to Stoyer et al., U.S. Pat. No. 7,328,107 issued to Strack et al. and U.S. Pat. No. 7,340,348 issued to Strack et al. all of which are assigned to the assignee of the present invention.

Many of the foregoing electromagnetic survey techniques are performed by deploying an array of electric and/or magnetic field sensors on the bottom of a body of water. For purposes of accurately mapping geologic structures using such electromagnetic survey techniques, it is normally important to be able to determine the geodetic orientation of the individual sensors as well as their geodetic positions. Techniques for determining geodetic orientation may include providing directional sensing devices for each sensor. Other techniques include measuring relative amplitudes of electromagnetic signals in each of two or three mutually orthogonal directions and using the geodetic positions of the electromagnetic signal source and receiver as a reference for geodetic orientation of the signals. The latter techniques have the advantage of eliminating the need to provide directional sensing devices for each electromagnetic sensor, which in large sensor arrays can be cost prohibitive and unreliable because of the number of sensors. However, the latter techniques can be inaccurate because a simplifying assumption made in determining signal direction is that the electromagnetic energy propagates in the vertical plane which includes both source and receiver, and that the polarization direction is orthogonal to the propagation direction. Because electrical conductivity in the subsurface is not uniform, such assumption is not precise; instead the energy propagation may depart from this vertical plane. What is needed is a method for determining electromagnetic sensor orientation that uses electromagnetic signal propagation direction yet avoids the inaccuracy associated with electromagnetic wave propagation through the subsurface, which may lie outside of this vertical plane.

SUMMARY OF THE INVENTION

A method for determining orientation of an electromagnetic survey sensor according to one aspect of the invention includes deploying the sensor at a selected position on the bottom of a body of water. An electromagnetic field is generated at a selected position in the body of water. A portion of the electromagnetic field is detected along at least two orthogonal directions at the sensor. The portion detected is identified as having traveled only within a vertical plane which includes both the position of a source of the electromagnetic field and the sensor position. The polarization direction of the portion of the electromagnetic field is determined from the detected portion, and the known positions of source and receiver. The determined polarization direction is used to determine the sensor orientation.

Other aspects and advantages of the invention will be apparent from the following description and the appended claims.

DETAILED DESCRIPTION

Figure 1A:
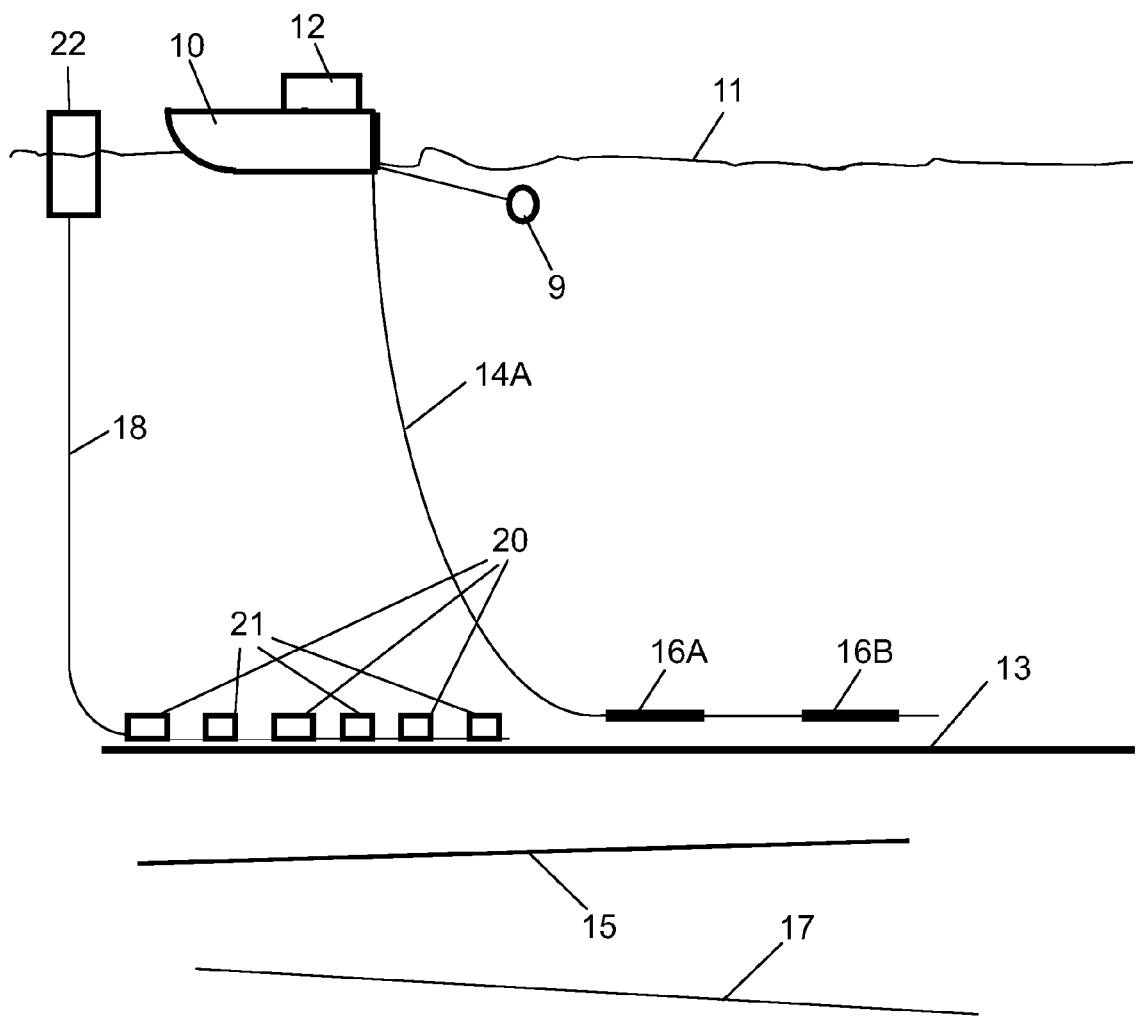
FIG. 1A shows a marine electromagnetic survey system using a horizontal electric dipole current source.

FIG. 1A shows one example of a marine controlled source electromagnetic survey system for use with methods according to various aspects of the invention. The system includes a survey vessel 10 that moves in a predetermined pattern along the surface of a body of water 11 such as a lake or the ocean. The vessel 10 includes thereon source actuation, signal recording and navigation equipment, shown generally at 12 and referred to herein as the "control/recording system." The control/recording system 12 includes a controllable source of electric current (not shown separately) used to energize electrodes 16A 16B towed in the water 11 near the bottom 13 thereof to impart an electric field in subsurface formations 15, 17 below the bottom 13 of the water 11. The control/recording system 12 typically includes instrumentation (not shown separately) to determine the geodetic position of the vessel 10 at any time, such as can be performed using global positioning system (GPS) receivers or the like. The control/recording system 12 in the present example can include equipment to transfer signals from one or more recording buoys 22. The recording buoys 22 may receive and store signals from each of a plurality of electromagnetic (EM) sensors 20 positioned at selected positions on the water bottom 13. Alternatively, the sensors' signals may be locally and autonomously recorded, and such recordings may be retrieved at the end of the survey. The sensors 20 are commonly deployed from the surface of the water, as autonomous nodes, without control of the final orientation, which must be deduced separately, as is the purpose of the present invention. The positions of the sensors 20 may be determined at the time of deployment by, for example, acoustic location techniques known in the art. The positions of the sensors will be used in a manner explained in more detail below.

The sensors 20 may be also disposed along a cable 18. In this case, their orientations are constrained by the position of the cable, which is separately determined. However, even in this case, the inference of the orientation of the receivers may be imperfect, especially in rough sea-floor conditions, and so the present invention may also be useful in this case. The cable 18 may be of a type ordinarily used in connection with seismic sensors deployed on the water bottom known in the art as "ocean bottom cables." The sensors 20 detect electric and/or magnetic fields that result from electric fields induced in the Earth's subsurface by current passing through the electrodes 16A, 16B. The sensors 20 will be explained in more detail below with reference to FIG. 2. The recording buoys 22 may include telemetry devices (not shown separately) to transmit data from the received signals to the vessel 10, and/or may store the signals locally for later interrogation by the control/recording system 12 or by another interrogation device. Alternatively, the sensors' signals may be locally and autonomously recorded, and such recordings may be retrieved at the end of the survey. The positions of the sensors 20 may be determined at the time of deployment by, for example, acoustic location techniques known in the art. The positions of the sensors will be used in a manner explained in more detail below.

The current source (not shown separately) on the vessel 10 is coupled to the electrodes 16A, 16B by a cable 14A. The cable 14A is configured such that the electrodes 16A, 16B can be towed essentially horizontally near the water bottom 13 as shown in FIG. 1A. In the present example, the electrodes can be spaced apart about 50 meters, and can be energized such that about 1000 Amperes of current flows through the electrodes 16A, 16B. This is an equivalent source moment to that generated in typical electromagnetic survey practice known in the art using a 100 meter long transmitter dipole, and using 500 Amperes current. In either case the source moment can be about $5 \times 10^4$ Ampere-meters. The electric current used to energize the transmitter electrodes 16A, 16B can be direct current (DC) switched off at a signal recording time-index equal to zero. It should be understood, however, that switching DC off is only one implementation of electric current change that is operable to induce transient electromagnetic effects. In other examples, the electric current may be switched on, may be switched from one polarity to the other (bipolar switching), or may be switched in a pseudo-random binary sequence (PRBS) or any hybrid derivative of such switching sequences. See, for example, Duncan, P. M., Hwang, A., Edwards, R. N., Bailey, R. C., and Garland, G. D., 1980, *The development and applications of a wide band electromagnetic sounding system using pseudo-noise source*. Geophysics, 45, 1276-1296 for a description of PRBS switching. In the present example, as the current through the transmitter electrodes 16A, 16B is switched, a time-indexed recording of electric and/or magnetic fields detected by the various sensors 20 is recorded, either in the sensor, in the recording buoys 22 and/or in the control/recording system 12, depending on the particular configuration of recording and/or telemetry equipment in the sensors 20, the recording buoys 22 and in the control/recording system 12.

The system shown in FIG. 1A (as well as systems shown in and explained with reference to FIGS. 1B and 1C) is described above as using switched DC to generate electromagnetic fields in the subsurface. For purposes of the invention, it is only necessary to switch the transmitter current to generate at least one transient electromagnetic field. The purpose of such transient electromagnetic field, as it relates to the present invention, will be further explained below. It is also possible to use simple alternating current of the type ordinarily used to conduct frequency domain electromagnetic surveying, or any of a number of more complicated continuous emissions of electromagnetic energy. The purpose of such continuously emitted electromagnetic field, as it relates to the present invention, will be further explained below.

Figure 1B:
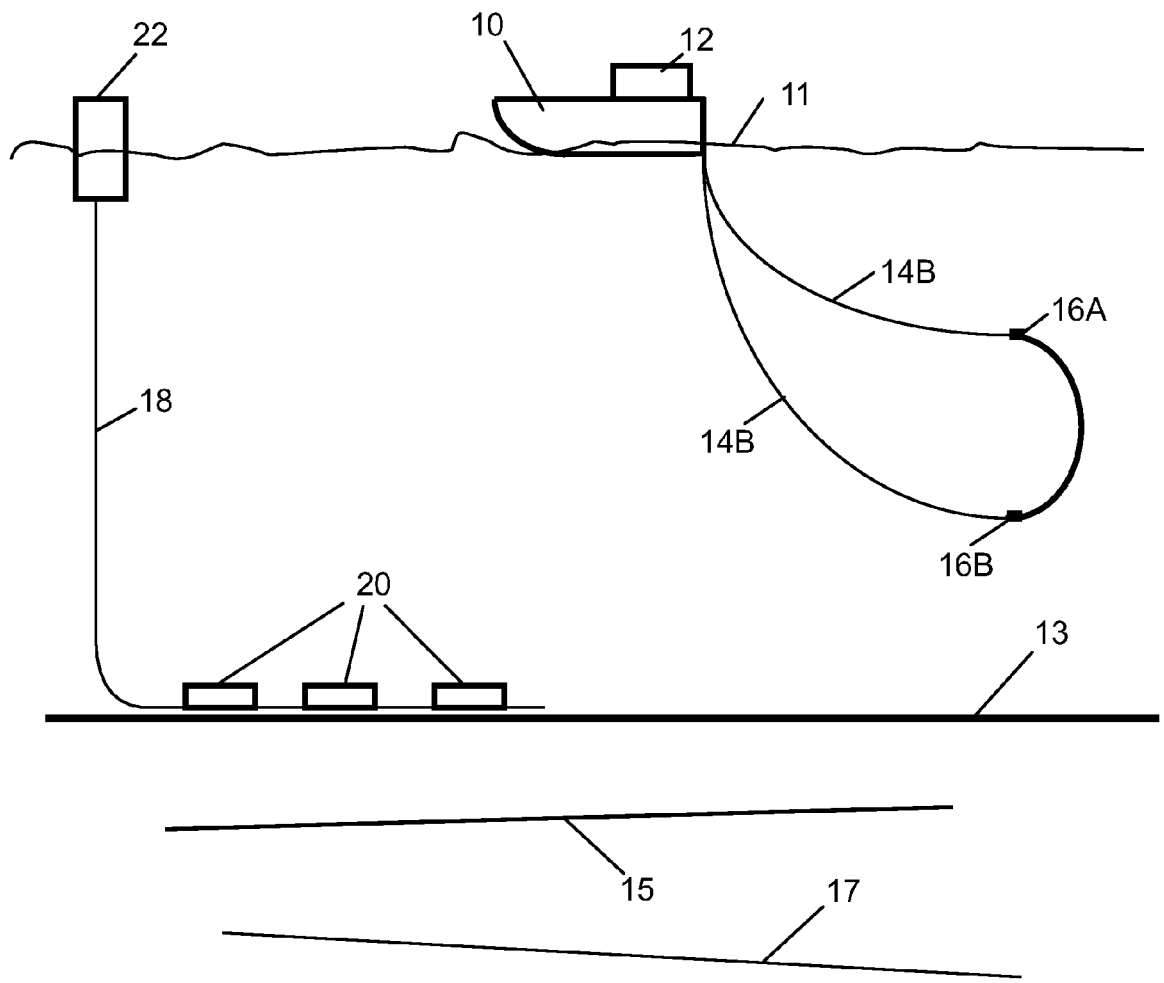
FIG. 1B shows a marine electromagnetic survey system using a vertical electric dipole current source.

FIG. 1B shows an alternative implementation of signal generation and recording, in which the transmitter electrodes 16A, 16B are arranged such that they are oriented substantially vertically along a cable 14B configured to cause the electrodes 16A, 16B to be oriented substantially vertically as shown in FIG. 1B. Energizing the electrodes 16A, 16B, detecting and recording signals is performed substantially as explained above with reference to FIG. 1A.

Referring once again to FIG. 1A, in some examples, the vessel 10 (or a second vessel, not shown) may also be used to tow a seismic energy source, shown generally at 9. The seismic energy source is typically an array of air guns, but can be any other type of seismic energy source known in the art. The control/recording system 12 in such examples includes control circuits (not shown separately) for actuating the seismic source 9 at selected times, and recording circuits (not shown separately) for recording signals produced by seismic sensors. In such examples, the ocean bottom cables 18 may also include seismic sensors 21. The seismic sensors 21 are preferably "four component" sensors, which as known in the art include three orthogonal geophones or similar motion or acceleration sensors collocated with a hydrophone or similar sensor responsive to pressure. Four component ocean bottom cable seismic sensors are well known in the art. See, for example, U.S. Pat. No. 6,021,090 issued to Gaiser et al.

In some examples, a substantially contemporaneous seismic survey may be conducted by periodically actuating the seismic energy source 9, and recording the signals detected by the seismic sensors 21. Interpretation of the seismic signals may be performed using techniques known in the art.

Figure 2:
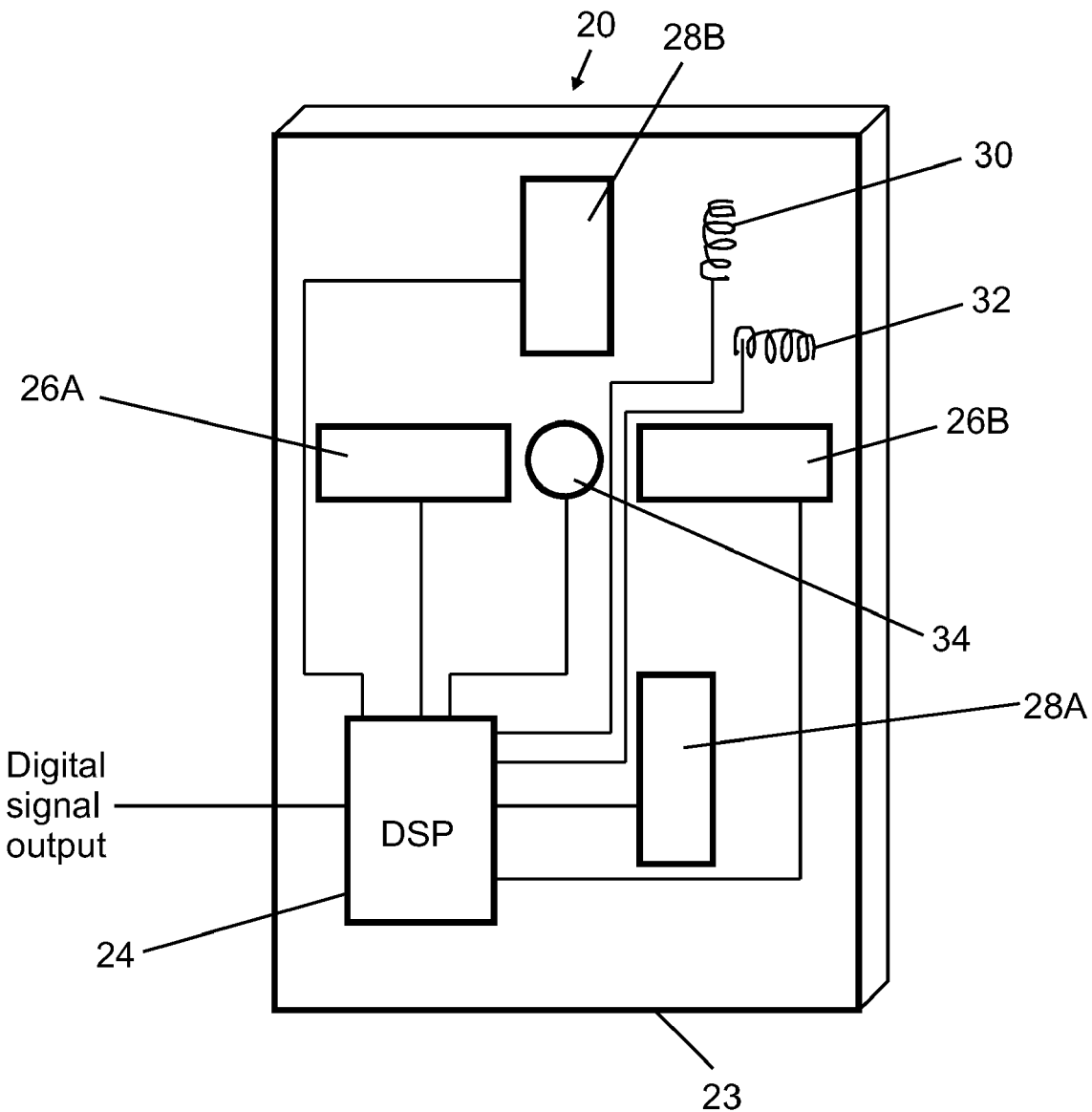
FIG. 2 shows one example of an ocean bottom electromagnetic system sensor.

FIG. 2 shows one example of an EM sensor 20 in more detail. The EM sensor 20 may be enclosed in a housing 23 made from a dense, electrically non-conductive, non-magnetic material, such as high-density plastic, such that the EM sensor 20 will sink in the water and rest on the water bottom (13 in FIG. 1A). Electrodes 26A, 26B, 28A, 28B are positioned on the bottom of the housing 23 such that they contact the water bottom (13 in FIG. 1A). The electrodes are arranged in dipole pairs. If the sensor is disposed along a cable, one pair 26A, 26B can be oriented along the length of cable (18 in FIG. 2), and measures voltages in one direction. The other electrode pair 28A, 28B measures voltages induced transversely to the first pair. If the sensors are not disposed along a cable, they still can contain two dipole pairs, substantially orthogonal to one another. The electrode pairs may span a distance of about 0.1 to 10 meters. The figure is not drawn to scale. The electrode pairs 26A, 26B and 28A, 28B may be coupled to a combined amplifier/digital signal processor 24 for converting the detected voltages into digital words corresponding to the voltage amplitude at selected moments in time. The present example of the sensor 20 may include one or more magnetometers 30, 32, 34 oriented along mutually orthogonal directions. In the present example, two of the magnetometers 30, 32 may be oriented such that their sensitive axes are oriented along the same direction as the dipole moment of a corresponding electrode pair 26A, 26B and 28A, 28B. The signal output of each magnetometer 30, 32 34 may be coupled to the digital signal processor 24. The digitized signal output of the signal processor 24 can be coupled to the recording buoy (22 in FIG. 1A) for transmission to the control/recording system (12 in FIG. 1A) or later interrogation by the control/recording system (12 in FIG. 1A), or stored locally for later recovery.

Figure 1C:
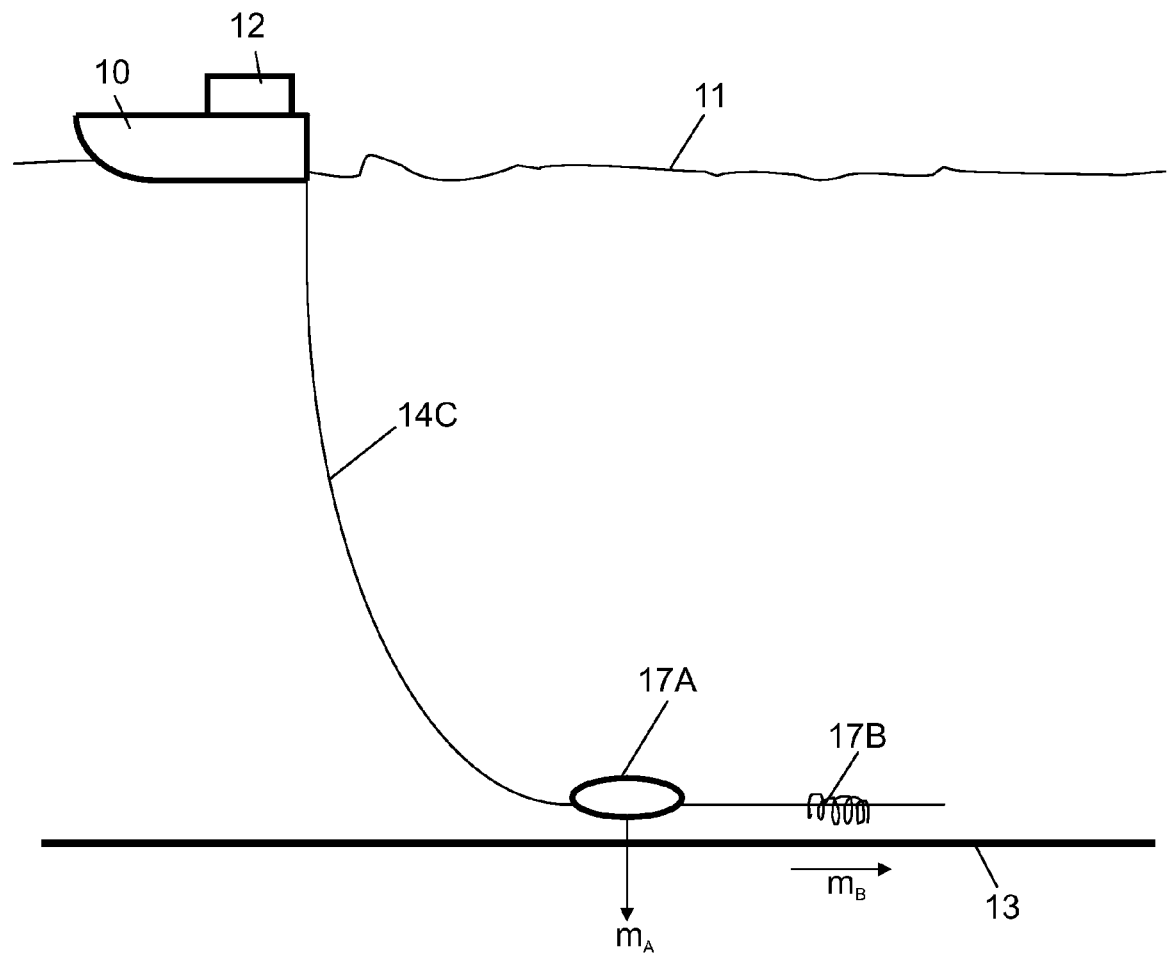
FIG. 1C shows an alternative way to energize the Earth's subsurface using magnetic fields.

The example of a system shown in FIG. 1A and FIG. 1B uses electric current applied to electrodes to impart an electric field into the Earth's subsurface. An alternative to imparting electric fields is to impart magnetic fields, and such will be explained with reference to FIG. 1C. In FIG. 1C, the vessel 10 tows a cable 14C which is connected to two loop transmitters 17A and 17B. The first loop transmitter 17A encloses an area perpendicular to the water bottom 13. Periodically, the control/recording system 12 causes electric current to flow through the first loop transmitter 17A. The current can be in any of the same forms as described with reference to FIG. 1A, including switched DC, PBRS, alternating polarity DC and switched AC. When the current is switched, a transient magnetic field having dipole moment along direction $M_A$ is imparted into the Earth. At the same or at different times, current is applied to the second loop transmitter 17B. The second loop transmitter may be in the form of a solenoid or coil, having a magnetic moment along direction $M_B$. Surveying using the magnetic field loop transmitters 17A, 17B may be performed substantially according to the survey pattern explained above with reference to FIG. 1A.

Whether sources such as shown in FIG. 1A or 1B are used, or any other sources, electromagnetic energy is imparted into the subsurface, and may be detected using sensors such as shown in FIG. 2, with component amplitudes of electric and/or magnetic fields measured along two substantially orthogonal directions. The measured component amplitudes may be used, according to techniques known in the art, to determine the direction of polarization of the electromagnetic field as it arrives at each individual sensor (e.g., 20 in FIG. 1A). It will be appreciated by those skilled in the art that the receivers record a measure of the incident electromagnetic field which is distorted by the "system response" of the recording system; this distortion does not affect the determination of the orientation of the receivers as long as it is the same for both of the two substantially orthogonal sensing directions.

It is known from Maxwell's equations that if the medium at the location of the receiver is electrically isotropic, and if the electromagnetic energy arrives at the receiver from a single direction, then the polarization of the electromagnetic energy is orthogonal to that direction. Further, if the resistivity distribution in the Earth's subsurface is laterally invariant, the EM propagation will lie in the vertical plane which includes both source and receiver positions. The positions of the transmitter and the receiver are known or are determinable from auxiliary information. Using the foregoing assumptions, the known or determined positions, and the measured polarization direction may be used to determine the sensor orientation. The method of the present invention recognizes that the above assumptions are not always valid, and defines an improved method which avoids such assumptions.

In the following, the invention is described in an example implementation with electric dipole sources and electric dipole receivers; those skilled in the art will appreciate that the same basic principle, with ordinary modifications, can be extended to other types of sources and receivers, and all of these variants are included within the scope of this invention. It is assumed that the sensors measure orthogonal horizontal components of the fields, although the present invention can be extended by those skilled in the art in a straightforward way to cases where the receiver sensors are non-orthogonal and/or tilted. Following are descriptions of a t-CSEM method, then an f-CSEM method.

In a t-CSEM method according to the present invention, when the current is switched to produce a transient electromagnetic field, a portion of such electromagnetic field will travel directly through the water, whereupon it is detected by the sensors. Other portions of the electromagnetic field may also travel through the air above the air-water interface, before being detected by the sensors. Other portions of the electromagnetic field may also travel through the formations below the water bottom, before being detected by the sensors. Such subsurface travel may deviate from that vertical plane which includes both source and receiver, because of a complicated distribution of electrical resistivity in the subsurface. As a result, such energy may arrive at the receiver from a direction that is not known. In such a case, the arrival polarization measured at the sensor, although it is in fact orthogonal to the arrival direction, cannot be used to determine the orientation of the sensor because the arrival direction is itself unknown. Further, the electromagnetic energy arriving through the subsurface may arrive from multiple directions simultaneously ("multi-pathing"), in which case no unique arrival direction exists. Again in such cases the measured arrival polarization cannot be used to determine the orientation of the receiver. Further, the subsurface may be electrically anisotropic, so that the arrival polarization is not orthogonal to the arrival direction, even if the arrival direction is known. In such a case, again the measured arrival polarization cannot be used to determine the orientation of the receiver.

By selecting that portion of the measured electromagnetic field that has traveled only in the vertical plane which includes both source and receiver, it is possible to determine the orientation of the sensors without error caused by propagation of the electromagnetic field outside of this plane, through electrically complicated subsurface formations. For example, if the source-receiver offset is sufficiently small, then the early-time arrivals (i.e., those arriving shortly after the initiation of the t-CSEM transient) will arrive at the sensor directly through the water, or perhaps also through the air, or perhaps also refracted along the sea floor. In these cases, the above assumptions are more accurate, such that the energy propagation occurs substantially in the vertical plane including both source and sensor, since in each of these bodies (water, air, and mud, respectively), the spatial distribution of electrical resistivity is simple. In this case, the said "selected portion" of the measured electromagnetic field is the early-time portion.

Figure 3A:
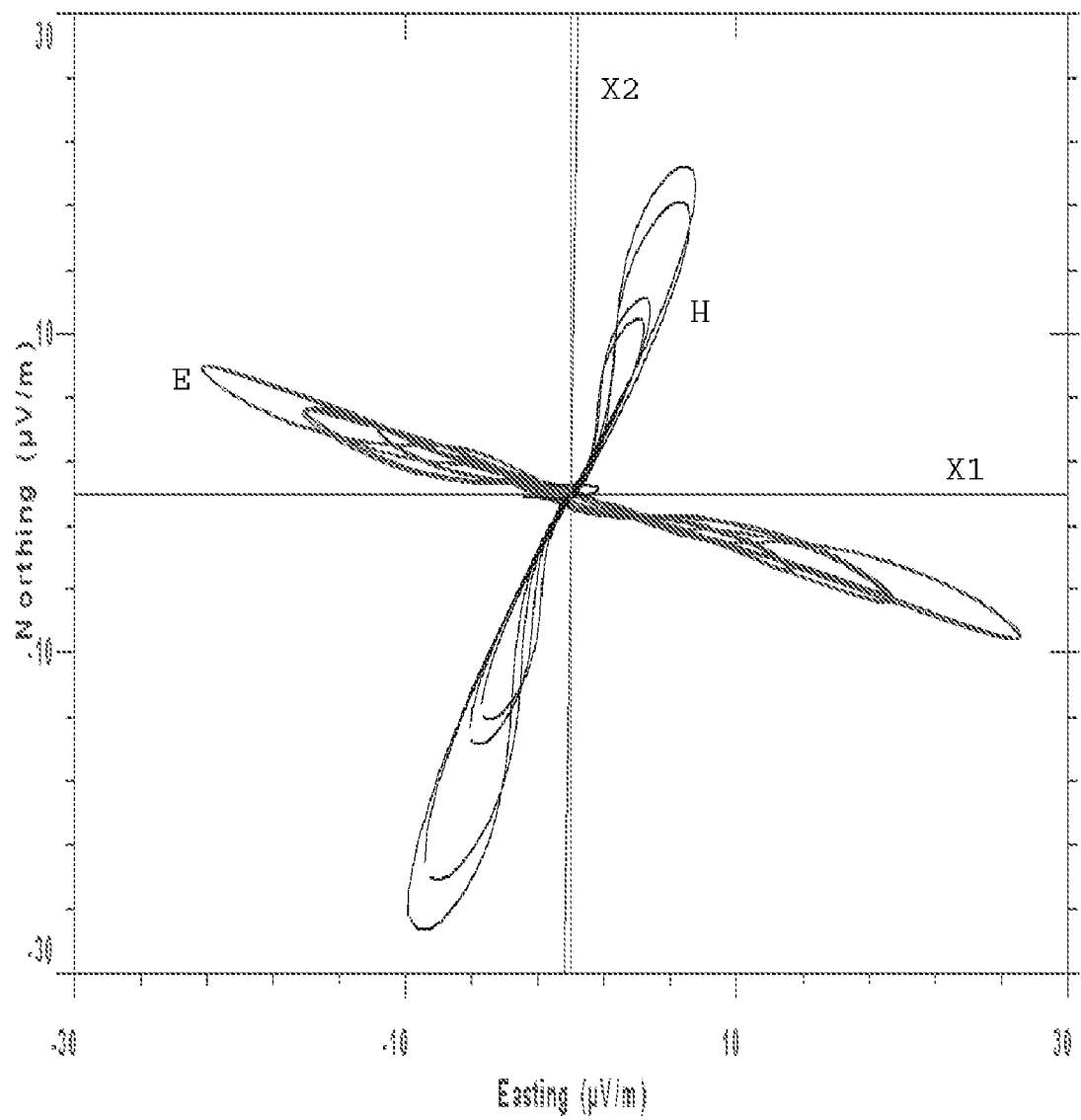
FIG. 3A shows data as recorded on the two components of an un-oriented receiver.
Figure 3B:
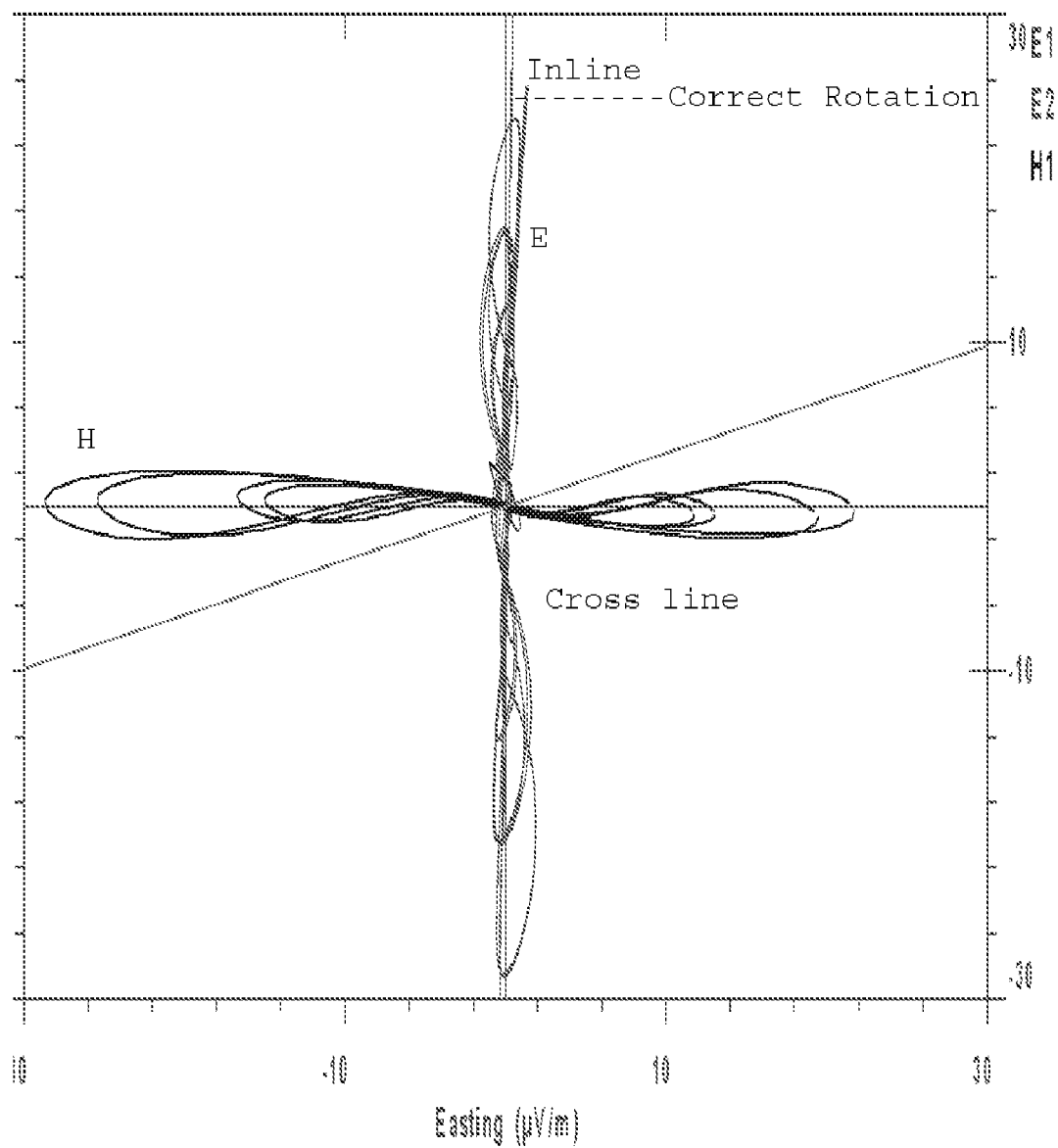
FIG. 3B shows data as rotated to the two components of the survey coordinate system.

To illustrate the foregoing example, consider the data presented in hodograms in FIGS. 3A, 3B. A hodogram is a plot of a two-component time-series, displayed as a curve on two component-axes. Both E-field and H-field are displayed, both before (FIG. 3A) and after (FIG. 3B) determination of the orientation of the receiver. In FIG. 3A, the axes of the plot are the axes of the receiver, as deployed, with unknown orientation; in FIG. 3B, the axes of the plot are inferred to be those of the survey, ie the ordinate (the "y-axis") is in the vertical plane which includes both source and receiver, and the abscissa (the "x-axis") is orthogonal to that. Note that several cycles of t-CSEM data are displayed (several loops of each field, with different amplitudes, each loop corresponding to a different source-receiver separation). The electric (E) field loops, for example, are asymmetrical. Each loop is a time-series, so the asymmetry means that later-arriving energy comes from different directions than the earlier-arriving energy. Any algorithm which selects a best-fit orientation will average these various orientations (as in the rotated FIG. 3B). This variety of directions is a consequence of the subsurface resistivity distribution, and has nothing to do with the true receiver orientation. In FIG. 3B, the rotation to the inferred survey axis has used such a best-fit orientation, this is typical of the "simple" orientation algorithms that constitute the state-of-the-art referred to above.

The correct rotation angle instead should be taken from the early, strictly rectilinear portion of the hodogram, as indicated in FIG. 3B. This early-arriving energy has traveled through the water (and perhaps air and perhaps near-bottom mud) only, thus reasonably accurately fulfilling the assumptions of the theory. The later-arriving energy, arriving through the deeper subsurface, has deviated from the inline azimuth, because of the distribution of resistivity in the deeper subsurface. This shows in the departure of the hodogram from strictly rectilinear form, which is required by the theory for simple formations. The deviation between the correct angle, and the average angle, is evidently site-dependent, but even small deviations can be important, because of the strong azimuth-dependence of the dipole radiation pattern.

The duration of the rectilinear motion in marine surveying is a function mainly of the water-depth, and the source-receiver offset, and must be determined from the data. The EM energy normally travels faster in the deep subsurface than in the water or the shallow subsurface, since the electrical resistivity is normally greater at depth. Hence, at far source-receiver offsets, the first-arriving energy may travel by indirect, deeper paths than the direct arrival through the water. In such a case, this first-arriving energy may be arriving from unknown directions, because of complicated distributions of the deep subsurface resistivity, as discussed above. Thus, there may be no strictly rectilinear pattern displayed on the hodogram for such source-receiver offsets.

The solution to this problem is to select, from the survey dataset, those source-receiver offsets which in fact do display an initial rectilinear portion of the hodogram. (Normally, this subset will occur with the shortest source-receiver offsets in which the recorded signal is not so strong as to drive the recording equipment non-linearly.) The receiver orientation is then determined from this subset of the data, as above, and it is normally valid to assume that this receiver orientation remains unchanged for the duration of the survey, as long as that receiver is not disturbed by the crew. Hence this same orientation may be assumed, even for those source-receiver offsets which did not contribute to its determination.

For the short offsets in particular, the source-receiver azimuth may differ from the pre-plotted value, or from the average value. This is because the receiver may be positioned off the pre-plotted line (because of inaccuracies in deployment), and because the source vessel may drift off the pre-plotted line because of wind or currents. (In fact, FIG. 3B shows these effects in the slightly variable azimuths of the rectilinear portions of the E-loops.) These effects will cause no difficulty in the orientation of the receivers, so long as the actual source-receiver azimuth is used in the computation, rather than the pre-plotted azimuth.

For added accuracy, the orientation of each receiver may be determined separately for a number of source-receiver offsets, and the results may be averaged, assuming that the actual receiver orientation does not change.

It will be clear to those skilled in the art that the present invention may be applied separately, at each receiver, to the electric field, and, with suitable modification due to its orthogonality with respect to the electric field, to the magnetic field. These separate determinations of orientations may be used together (e.g. by averaging) or separately (e.g. through an analysis of data quality) to refine the determination of the receiver.

In an f-CSEM method according to the present invention, there is no "early time", since the source is continuously active. At all times, EM energy is arriving at the receivers from a series of source positions and a variety of transmission pathways. Hence, the t-CSEM method described above cannot be applied. One way to overcome this is to interrupt the f-CSEM source sequence at selected source-receiver offsets, converting to a t-CSEM mode of sourcing to determine each receiver orientation, and then resuming normal f-CSEM operations at other source-receiver offsets. This constitutes a variant of the t-CSEM procedure described above, but may not be operationally convenient.

Figure 4A:
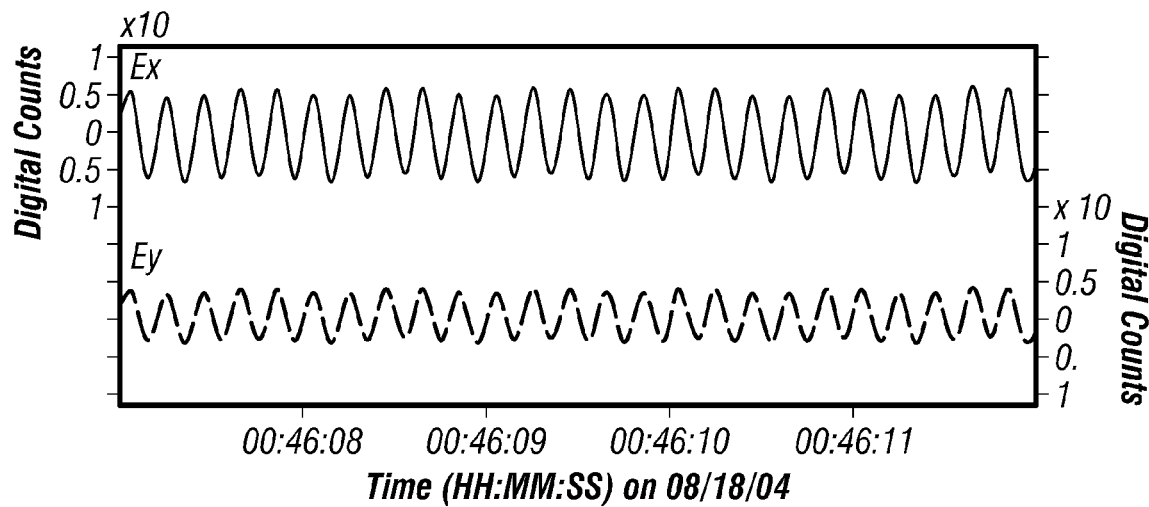
FIGS. 4A through 4D show typical f-CSEM data and processing thereof.

Another f-CSEM method may be described using FIGS. 4A through 4D, which are taken from the website http://marineemlab.ucsd.edu of the Scripps Institution of Oceanography. The two-component "Time Series" in FIG. 4A show five seconds of recorded signals, recorded as the source vessel steams along the survey line. Such recorded signals are processed into the form shown in FIG. 4B as "Amplitude" and in FIG. 4C as "Phase" at a given sensor, as a function of source-receiver offset. Also in FIG. 4D, the recorded signals are rotated into the survey coordinate system using the simple algorithm described above, although also as explained above, the hodograms do not form ellipses, but rather form more complicated patterns.

Figure 4B:
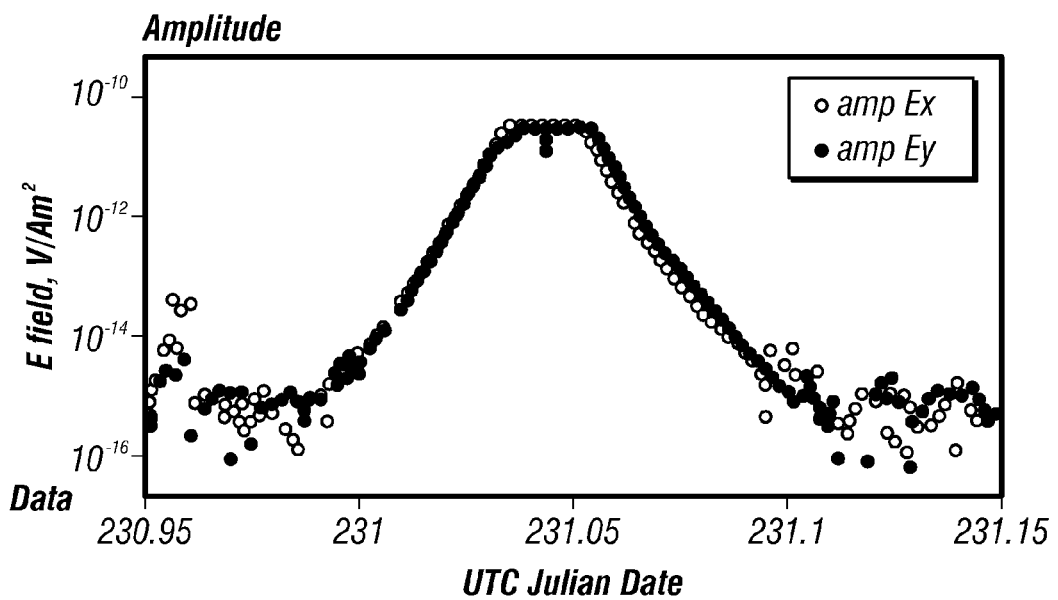
Figure 4C:
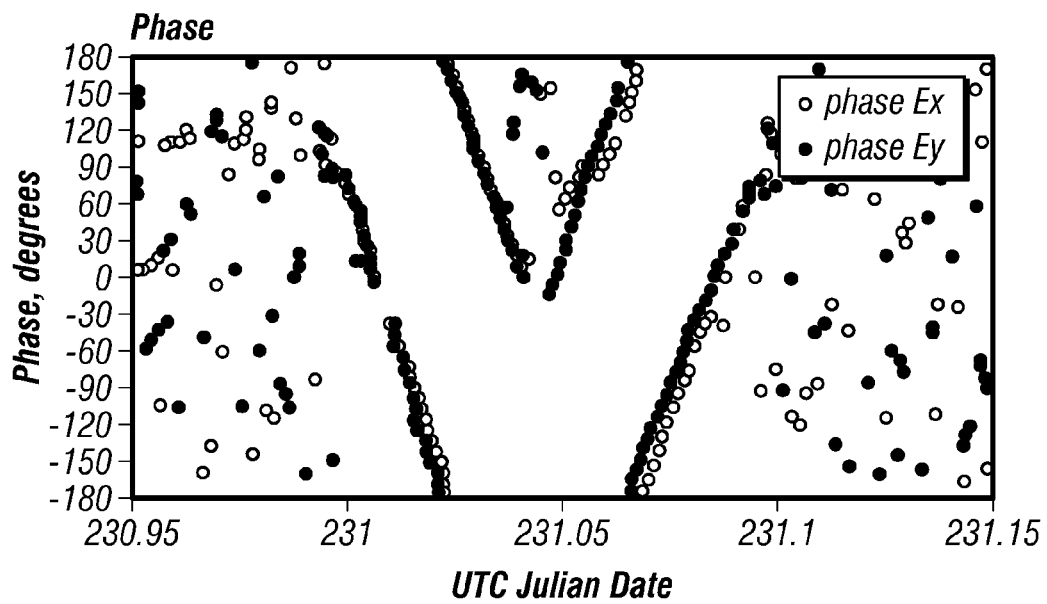
Figure 4D:
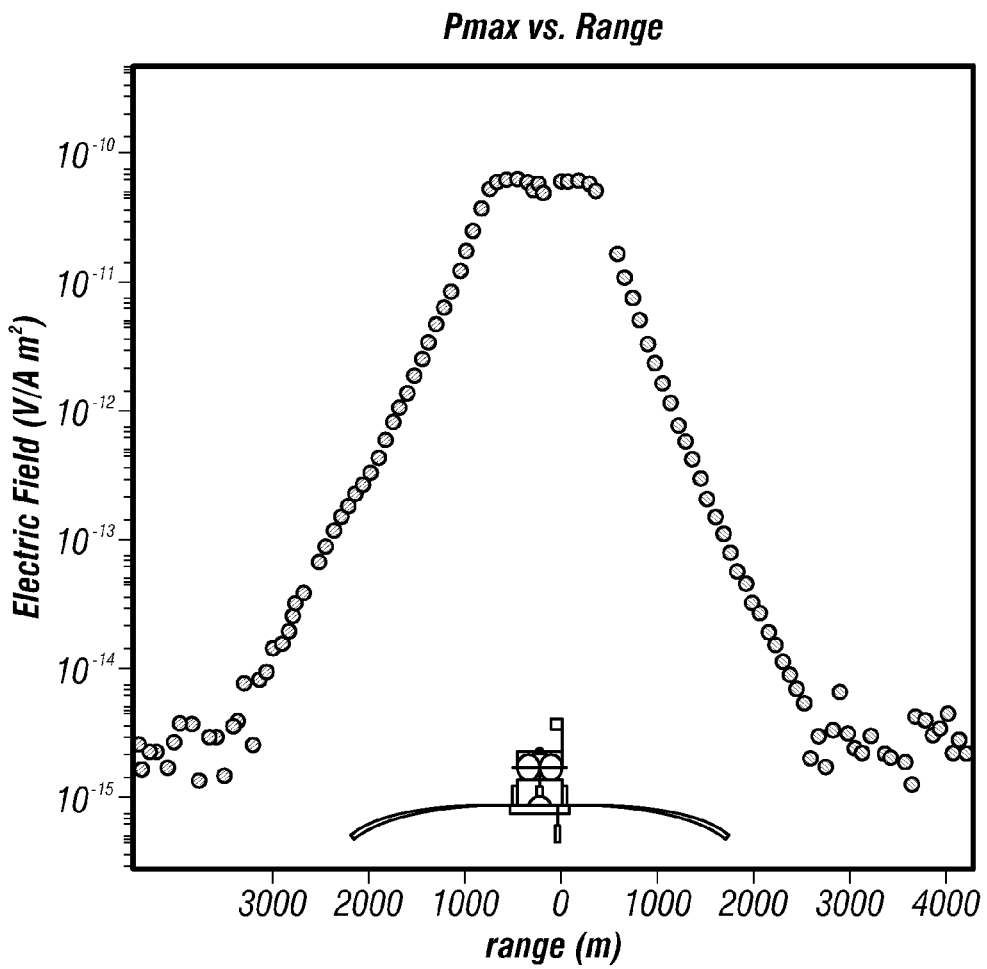

The shortest offsets are shown at the centers of FIGS. 4B, 4C and 4D, with the Amplitude graph (FIG. 4B) showing a flat region which has been clipped because of the non-linear effects described above occurring at the shortest offsets. This phenomenon also occurs in t-CSEM data, as mentioned earlier herein. For properly recorded offsets, just longer than the ones shown above in which clipping occurs, the EM energy arrives with greater amplitude than for longer offsets, according to FIGS. 4B through 4D. The strongest energy, from these selected source-receiver offsets, has arrived via the direct paths described above, lying in the vertical plane as described above, and the energy arriving by other paths, from unknown directions (caused by the unknown subsurface distribution of resistivity) has lower amplitude. A hodogram constructed using just these most energetic arrivals, with the low-amplitude arrivals of each cycle omitted, will be substantially rectilinear, because this selected portion of the signals will conform most closely to the assumptions that the energy has propagated in the vertical plane containing both source and receiver. As with the t-CSEM method, the details of the process of selecting an appropriate subset of data is to be determined by the data themselves, guided by the arguments above, but ultimately based upon those portions of the hodograms which are accurately rectilinear.

Methods according to the invention may provide more accurate determination of electromagnetic sensor orientation than is possible using methods known in the art.

While the invention has been described with respect to a limited number of examples, those skilled in the art, having benefit of this disclosure, will appreciate that other examples can be devised which do not depart from the scope of the invention as disclosed herein. Accordingly, the scope of the invention should be limited only by the attached claims.

What is claimed is:

1. A method for determining orientation of an electromagnetic survey sensor deployed at a selected sensor position, comprising:
   inducing an electromagnetic field at a selected position above a portion of the Earth's subsurface to be surveyed;
   detecting the induced electromagnetic field along at least two substantially orthogonal directions at the sensor position;
   selecting a portion of the electromagnetic field detected along the at least two substantially orthogonal directions at the sensor position, the portion of the field having traveled only in a substantially vertical plane including the inducing position and the sensor position;
   determining a polarization direction of the selected portion of the electromagnetic field from the selected portion; and
   using the determined polarization direction to determine the orientation of the sensor.

2. The method of claim 1 wherein the electromagnetic field is a transient electromagnetic field.

3. The method of claim 2 wherein the transient electromagnetic field is generated by switching electric current through at least one of a dipole antenna and a wire coil.

4. The method of claim 3 wherein the current includes direct current.

5. The method of claim 3 wherein the switching includes at least one of switching the current on, switching the current off, switching the current polarity, generating a pseudo random binary sequence and hybrids thereof.

6. The method of claim 2 wherein the detecting includes detecting electric field amplitude.

7. The method of claim 2 wherein the detecting includes detecting magnetic field amplitude.

8. The method of claim 2 wherein the selecting the portion of the electromagnetic field comprises selecting a portion of signals detected by the sensor which arrives within a selected time after the initiation of the transient electromagnetic field.

9. The method of claim 8 wherein the selection of the portion traveling in the vertical plane is based upon a hodogram plot of the detected signals being substantially rectilinear.

10. The method of claim 9, where the rectilinear portion of the hodogram is maximized by selecting at least one source-receiver offset.

11. The method of claim 10, where the at least one source-receiver offset is a nearest offset for which the sensor faithfully records the arriving energy without electronic saturation or non-linear effects.

12. The method of claim 11, wherein a plurality of appropriate source-receiver offsets are selected, and an average orientation is determined from the signals from the plurality of offsets.

13. The method of claim 1, wherein the electromagnetic field is substantially continuous.

14. The method of claim 13 wherein the substantially continuous electromagnetic field is generated by passing alternating electric current through at least one of a dipole antenna and a wire coil.

15. The method of claim 13 wherein the detecting includes detecting electric field amplitude.

16. The method of claim 13 wherein the detecting includes detecting magnetic field amplitude.

17. The method of claim 13 wherein the selecting the portion of the electromagnetic field comprises selecting a portion of the detected electromagnetic field having the highest energy.

18. The method of claim 17 wherein the selection of the portion of the electromagnetic field in the vertical plane is based upon a hodogram plot of the detected signals being substantially rectilinear.

19. The method of claim 18, where the rectilinear portion of the hodogram is maximized by selecting at least one appropriate source-receiver offset.

20. The method of claim 18, where the at least one source-receiver offset is the nearest offsets for which sensors faithfully record arriving energy, without electronic saturation or non-linear effects.

21. The method of claim 18, wherein a plurality of source-receiver offsets is selected, and an average orientation is determined from the plurality of offsets.

22. The method of claim 1 wherein the detecting the induced electromagnetic field comprises measuring an electric field induced by the electromagnetic field and measuring a magnetic field induced by the electromagnetic field, and wherein the determining polarization includes using the measured electric and magnetic fields.

* * * * *